United States Patent [19]

Kontinen

[11] 4,100,717
[45] Jul. 18, 1978

[54] FOLDED SEAL FOR PLASTIC SHEETING AND FORMING APPARATUS

[76] Inventor: Martti Kontinen, Ohjaajantie 16 A 12, 00400 Helsinki 40, Finland

[21] Appl. No.: 775,198

[22] Filed: Mar. 7, 1977

[30] Foreign Application Priority Data

Jun. 2, 1976 [FI] Finland .................. 761562

[51] Int. Cl.² .............. B65B 51/04; B65B 7/06
[52] U.S. Cl. .................. 53/138 R; 29/235;
 29/453; 53/138 A; 53/371
[58] Field of Search .......... 53/138 R, 138 A, 371,
 53/287, 290, 38, 40, 41, 44; 29/453, 235, 280,
 282; 227/15, 16, 17, 19, 20, 33, 34, 153

[56] References Cited

U.S. PATENT DOCUMENTS

| | | | |
|---|---|---|---|
| 788,969 | 5/1905 | Walker | 29/235 X |
| 1,243,728 | 10/1917 | Gagnon | 29/235 X |
| 1,555,652 | 9/1925 | Frame | 29/235 X |
| 1,971,723 | 8/1934 | O'Dell | 29/453 |
| 2,358,142 | 9/1944 | Carlin | 29/235 X |
| 2,638,131 | 5/1953 | Rohs | 29/235 X |
| 2,812,628 | 11/1957 | Russell et al. | 53/138 A X |
| 3,084,345 | 4/1963 | Hodges, Jr. | 227/20 |
| 3,343,253 | 9/1967 | Omori | 53/138 A X |
| 3,636,611 | 1/1972 | Rosenbaum | 53/138 A X |

FOREIGN PATENT DOCUMENTS

1,205,714 1958 France ................. 53/38

Primary Examiner—Horace M. Culver
Attorney, Agent, or Firm—McGlew and Tuttle

[57] ABSTRACT

A folded seal for plastic sheeting comprising, a retaining rod, a portion of the sheeting to be sealed wrapped around the retaining rod, and a slotted tube or channel having slot edges that are biased toward each other tending to form a closed tube or channel, disposed around the retaining rod and sheet portion and urging portions of the sheet adjacent the slot edges toward each other to form a seal. Apparatus for forming the seal comprises a guiding unit for holding the retaining rod, a sealing unit for holding the slotted tube spaced from and movable toward the guiding unit, plastic sheeting to be sealed disposed between the guiding and sealing units, and means for moving the sealing unit toward the guiding unit. The sealing unit includes a slotted tube opening bar for separating the slot edges and allowing the retaining rod with a portion of sheeting therearound to enter the slotted tube. Further provided are disengagement methods for freeing the newly formed seal from the guiding and sealing units.

2 Claims, 6 Drawing Figures

FOLDED SEAL FOR PLASTIC SHEETING AND FORMING APPARATUS

BACKGROUND OF THE INVENTION

1. Field of the Invention

This invention relates in general to sheet sealing methods and devices and, in particular, to a new and useful sheet seal and apparatus for forming a hermetic seal comprising an inner retaining rod having a portion of sheeting to be sealed wrapped therearound and enveloped by a slotted tube having slot edges biased toward each other to urge adjacent portions of the sheeting wrapped around the retaining rod together to form the hermetic seal.

2. Description of the Prior Art

In packing operations using plastic cover sheetings, it is often necessary to join the edges of sheets to form sealed borders. Among the various methods of forming this seal is a means using a stiff plastic rod which has an accompanying slotted hollow cylinder or tube that closely fits over a portion of the rod. To form a seal, two sheets of plastic sheeting material are placed between the rod and the tube and the seal is held hermetically tight by the close fitting between the rod and the tube. Such an arrangement is disclosed in U.S. Patent No. 3,149,943.

Disadvantages of the prior art seals using the above method include the requirement of a high degree of precision in the manufactured sizes of the rods and slotted tubes which are used. Since the seal depends on a close fitting of the tube around the rod, any variation in the cross-section diameters of either piece may cause leakage of the seal. Similarly, slight warping of the tube or rod, during shipment or storage for example, may result in a poor seal.

SUMMARY OF THE INVENTION

The present invention provides an improved sealing device, and an apparatus for sealing a plastic sheet. The seal made in accordance with the invention comprises a retaining rod or stiff elongated member which is partially wrapped along its long axis with a portion of two or more plastic sheets which are to be hermetically sealed to each other. A stiff slotted tube or channel is snapped over the retaining rod and sheet portions to form the seal. The slotted tube is formed with opposing slot edges that are biased toward each other and tend to close the tube. Due to this biasing, when the slotted tube is placed around the rod, the portions of sheet material between the slot edges are urged together firmly enough to form a hermetic seal along the edges. The only requirement of size is that the retaining rod is smaller in outside diameter than the inside diameter of the slotted tube, so that the slot edges will be urged together when the tube is placed over the rod and sheet portions.

In another embodiment of the invention, the slotted tube or channel is formed with slot edges curved toward the web portion of the slotted tube or channel. This structure allows for the engagement of the retaining rod into the slotted tube by merely forcing the rod with sheet portions therearound against the slotted tube in the areas adjacent the inturned slot edges. Due to the curvature of the slot edge surfaces facing the rod, the slotted tube is forced open to admit the rod and sheet portions, then is closed on the rod and sheet portions due to the biasing or elasticity of the slotted tube body and web.

In one embodiment of the apparatus for forming the seal, the plastic sheeting to be sealed is held between a guiding unit and a sealing unit. The guiding unit comprises a carriage having a fixed thrusting bar disposed thereacross. A stiff elongated member or retaining rod is disposed on the thrusting bar, facing the sheeting. On lateral sides of the thrusting bar are disposed guide jaws having springs biasing the guide jaws toward the retaining rod and holding the retaining rod on the thrusting bar. Spaced from and facing the guiding unit is a sealing unit having a second carriage which is movable toward the guiding unit. Sealing jaws are pivotally mounted on the second carriage. Portions of the sealing jaws facing the guiding unit form a slotted tube or channel space for holding a slotted tube or channel therein. Claws are formed on each sealing jaw portion adjacent the slotted tube space, for embracing each slot edge of the slotted tube. A spreading bar is disposed between the sealing jaws and adjacent an inclined surface portion on each sealing jaw.

In operation, a seal is formed as follows: the sealing unit with slotted tube held thereon is moved toward the guiding unit. The sealing jaws are spread by the movement of the spreading bar against the inclined surface portions of each sealing jaw. Since each slot edge of the slotted tube is held by respective claws on each sealing jaw, the slotted tube is opened in the area of its slot which faces the guiding unit and the retaining rod. As the sealing unit progresses toward the guiding unit, the sheeting material between these units is forced against and around the retaining rod which is held on the guiding unit. Portions of the sealing jaws then engage with the guiding jaws of the guiding unit and force the guiding jaws back against the bias of the springs and away from the retaining rod, to free the rod. The continued forward motion of the sealing unit forces the thrusting bar into the slotted tube and causes the slot edges to fall free of the claws on each sealing jaw. With the slotted tube extending around the retaining rod and a portion of the sheeting material, the seal is formed. After the forming of the seal the guiding and sealing units are separated to await reloading with respective retaining rods and slotted tubes for the next sealing operation.

In another embodiment of the apparatus for use with slotted tubes or channels having inturned slot edges, both guiding and sealing units are provided with thrusting bars having lateral guiding jaws biasing toward each other. The retaining rod is held in one unit by its guiding jaws and the slotted tube is similarly held in the other unit. In operation the two units are moved together. Sheeting material, which is suspended between the units, is forced around the retaining rod under the action of the inturned slot edges of the approaching slotted tube as the thrusting bars force them together. The guide jaws are forced back against their respective biasing spring and away from the newly formed seal to free it from the respective units. The units are then moved away from each other to allow a removal of the seal and a reloading of the units for the next operation.

An object of the invention is to provide a sheet seal that has a reliable hermetic seal character without the need for great precision in the sizing of the seal parts.

Another object of the invention is to provide a seal forming apparatus which can be easily loaded with seal parts and quickly and reliably form a seal therebetween.

A still further object of the invention is to provide a seal that is formed by the pressing of slotted tube edges against portions of sheeting material to form a reliable hermetic seal along the border formed by the slotted tube edges.

A further object of the invention is to provide a seal and apparatus that is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there are illustrated preferred embodiments of the invention.

DESCRIPTION OF THE PREFERRED EMBODIMENTS

Figure 1:
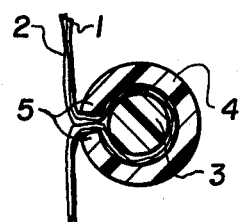
FIG. 1 is a cross-sectional view of one embodiment of the seal made in accordance with the invention.

Referring now to the drawings in particular, the invention embodied therein comprises, in FIG. 1, a seal formed as follows: plastic sheeting 1 and 2 are passed over a retaining rod 3 and are locked in position with the aid of a slotted tube or channel 4, which encircles the retaining rod. The edges 5 bounding the slot of the slotted tube are biased toward each other and hermetically clasp the sheeting 1 and 2 between them.

Figure 2:
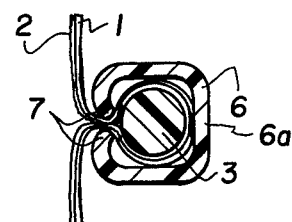
FIG. 2 is a cross-sectional view of another embodiment of the seal made in accordance with the invention.

FIG. 2 shows another embodiment of the seal made according to the invention. The slot edges of the slotted tube 6 are bent inward toward web 6a, to form inturned flanges 7, 7. This gives the seal additional rigidity, and, on the other hand, a seal of this type is advantageous from the production viewpoint as described later.

Figure 3:
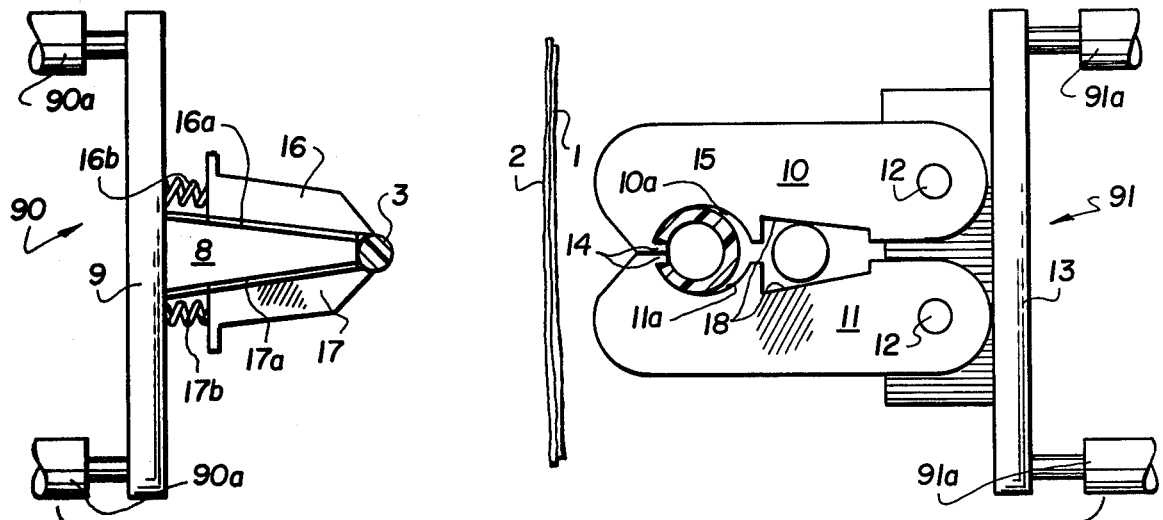
FIG. 3 is an end view of one embodiment of the apparatus for making the seal of FIG. 1.
Figure 4:
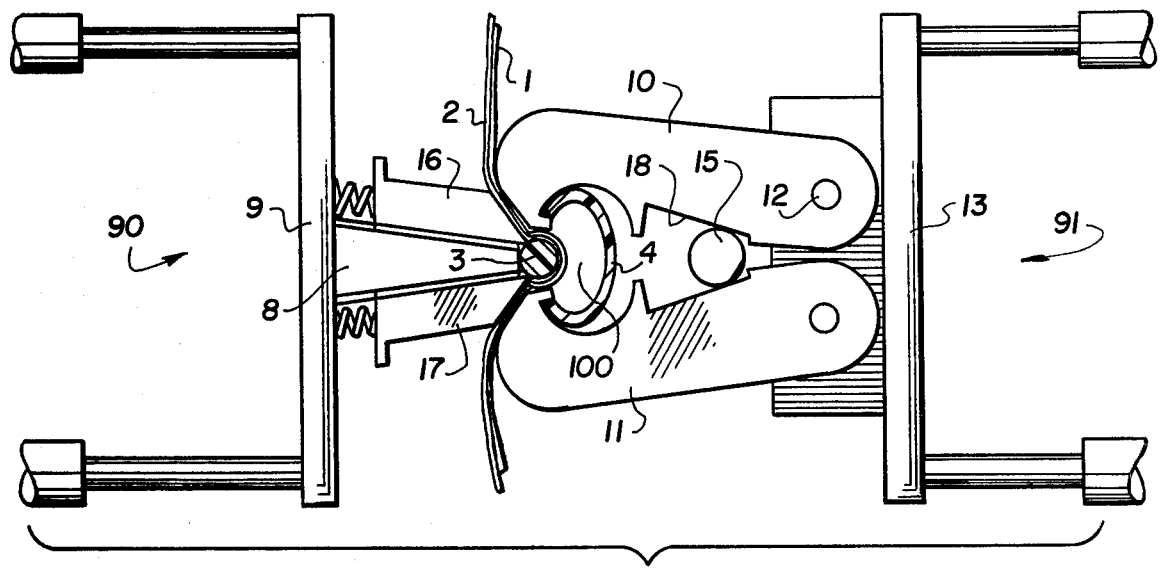
FIG. 4 is an end view of the apparatus of FIG. 3 in an intermediate position of a seal forming operation.

FIG. 3 shows an example of the application of the sealing apparatus described in the invention. The sealing apparatus has a guide unit 90 which includes guide jaws 16, 17 and a thrust bar 8. The thrust bar 8 is attached to a carriage 9, which moves on horizontal guides with the aid of pneumatic cylinders 90a and 91a. The guiding jaws 16, 17 are, with their own guides 16a and 17a attached to the sides of the thrust bar 8. When the guiding jaws 16, 17 are in inactive positions, their tips form a cavity, into which the retaining rod 3, which has already been cut to appropriate length, is inserted. Jaws 16, 17 are held there by biasing springs 16b and 17b. The retaining rod is fed in preferably from a coil with a special feeding apparatus (not shown). Feeding apparatus and an attached cutting apparatus (not shown) are placed immediately beside the sealing apparatus.

Sealing unit 91 is special form unit 90 and is on the other side of the sheeting 1, 2. Sealing jaws 10, 11 have curved surfaces 10a and 11a which encircle the slotted tube 4. These jaws 10 and 11 are pivotally mounted to a second carriage 13 at points 12, 12. The carriage 13 glides on the same guides (not shown) as the carriage 9. The tips of the jaws 10, 11 are formed as inward turned claws 14, with which the edges of the slotted tube 4 are spread outwardly. The motion for spreading the jaws is caused by a spreading bar 15, which glides along inclined surface portions 18 and forces the jaws apart when carriages 9 and 13 are moved together.

The fabrication of the seal is carried out as follows: when the carriages 9 and 13 are in inactive positions, a piece of the retaining rod and the slotted tube, which have been cut to length, are inserted into their respective cavities in the tips of the parts 16, 17, 8 and 10, 11. The sheeting destined to be sealed together are placed between the units 90, 91. The carriages 9, 13 are moved toward each other with the aid of pneumatic cylinders 90a and 91a. Before the guiding jaws 16, 17 meet the spreading jaws 10, 11, the spreading bar 15 is stopped by a guard (not shown). As the carriage 13 continues its movement, the spreading bar glides along the inclined surface portions 18 and force the jaws 10, 11 open. At this point the guiding jaws 16, 17 with the sealing jaws 10, 11 form a closed guiding channel 100, along which the retaining rod 3 and the sheeting placed around it are inserted into the slotted tube 4.

The movement continues until the thrusting bar 8 thrusts the slotted bar loose from the claws 14, and hereby on account of its own elasticity the slotted tube 4 is pressed together and prevents the seal from opening. Now the jaws 10, 11 are opened completely by a mechanism (not shown). The finished seal is released from the sealing apparatus and the units 90 and 91 return to their initial positions.

Figure 5:
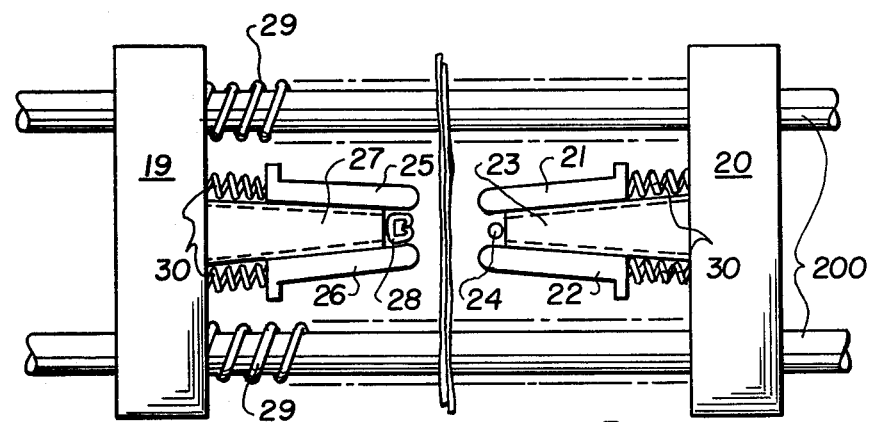
FIG. 5 is a view similar to FIG. 3 of another embodiment of the seal forming apparatus for forming the seal of FIG. 2.
Figure 6:
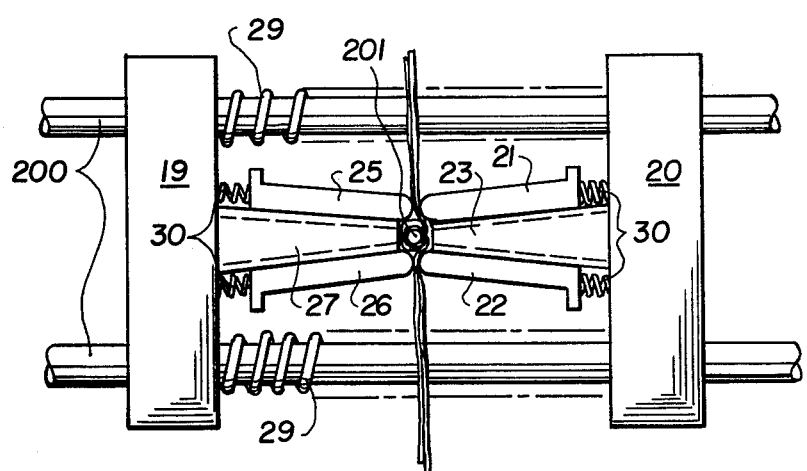
FIG. 6 is a view smaller than FIG. 4 of the apparatus in FIG. 5 in an intermediate seal forming position.

FIGS. 5 and 6 show another embodiment of the sealing apparatus according to the invention. Here, the carriages moving on horizontal guides 200 are marked with reference numbers 19, 20. Onto both carriages are attached thrusters 3, 27, respectively, to which are joined guiding jaws 21, 22, 25 and 26. The carriages 19, 20 are moved towards each other with the aid of pneumatic cylinders (not shown) and the return movement is brought about by springs 29. The guiding jaws are fitted with springs 30, which bias jaws in a forward direction.

The sealing apparatus functions in the following way: When the carriages 19, 20 are in their inactive position (FIG. 5), ready-cut pieces of the retaining rod 24 and the slotted tube 28 are placed in the cavities formed between the guiding jaws. The portion of the sheeting to be sealed is placed between the carriages 19, 20 which are moved towards each other. Thereby the guiding jaws engage each other and form a closed guiding channel 201, along which the retaining rod with sheetings 1 and 2 therearound are forced into the slotted tube. In this sealing apparatus it is necessary to use a slotted tube of the type shown in FIG. 2, on which the slot edges are turned inward. When the effect of the forces ceases, the carriages return to their initial positions and the finished seal is released from the sealing apparatus.

While specific embodiments of the invention have been shown and described in detail to illustrate the application of the principles of the invention, it will be understood that the invention may be embodied otherwise without departing from such principles.

The embodiments of the invention in which an exclusive property or privilege is claimed are defined as follows:

1. An apparatus for making a seal having a retaining rod wrapped with a portion of sheeting material to be sealed and enveloped by a slotted tube having slot edges biased toward each other comprising: a guide means for supporting the retaining rod, sealing means spaced from said guide means and movable toward said guide, said sealing means gaving gripping surfaces for supporting the slotted tube in a manner so as to hold the slotted tube with its slot edges facing the retaining rod held in said guiding means, means for positioning sheeting material to be sealed between said guide and sealing means, means for moving said sealing means toward said guiding means to cause a portion of the sheeting material to be wrapped around the retaining rod and to direct the retaining rod with the sheeting material therearound into the slot of said slotted tube, said slotted tube being closable over said sheeting and said rod and the edges of said tube bounding said slot being movable together to seal said sheeting; said guiding means further comprising a carriage, a thrusting bar extending from said carriage for supporting the retaining rod, at least one guiding jaw slidably mounted to a side of said thrusting bar and biased toward the retaining rod to form a guide space with said thrusting bar for the retaining rod; said sealing means further comprising a second carriage which is movable with respect to said guiding means carriage, a second thrusting bar for supporting the slotted tube in a position facing the retaining rod held in said thrusting bar of said guiding means, at least one guiding jaw slidably mounted to a side of said second thrusting bar and biased toward the slotted tube held by said second thrusting bar to form a second guiding spaced for said slotted tube, said retaining rod guiding space and said slotted tube guiding space being combined when said sealing means is moved toward said guiding means and said space being reduced in size when said guiding jaws of said guiding means and sealing means are forced against each other and against said respective guiding jaw biasing.

2. An apparatus for making a seal having a retaining rod wrapped with a portion of sheeting material to be sealed and enveloped by a slotted tube having slot edges biased toward each other comprising: a guide means for supporting the retaining rod, sealing means spaced from said guide means and movable toward said guide, said sealing means having gripping surfaces for supporting the slotted tube in a manner so as to hold the slotted tube with its slot edges facing the retaining rod held in said guiding means, means for positioning sheeting material to be sealed between said guide and sealing means, means for moving said sealing means toward said guiding means to cause a portion of the sheeting material to be wrapped around the retaining rod and to direct the retaining rod with the sheeting material therearound into the slot of said slotted tube, said slotted tube being closable over said sheeting and said rod and the edges of said tube bounding said slot being movable together to seal said sheeting; said guiding means further comprising a carriage, a thrusting bar extending from said carriage for supporting the retaining rod, at least one guiding jaw slidably mounted to a side of said thrusting bar and biased toward the retaining rod to form a guide space with said thrusting bar for the retaining rod; said sealing means further comprising a second carriage which is movable toward said guiding means carriage, at least one spreading jaw pivotally mounted to said second carriage having a portion facing said guiding means with a slotted tube space for admitting a slotted tube therein, a claw adjacent one end of said slotted tube space for engaging one slot edge of the slotted tube, said sealing jaw having an inclined surface means, and a jaw opening means for opening said sealing jaw on said pivot mounting by said opening means acting against said inclined surface means, said opening progressing as said sealing means is moved toward said guiding means to cause at least one of the slot edges of the slotted tube to separate from the other slot edge and allow the entry of the retaining rod and a portion of sheeting material wrapped therearound, into the slotted tube.

* * * * *